(12) United States Patent
Vasquez

(10) Patent No.: US 6,743,461 B1
(45) Date of Patent: Jun. 1, 2004

(54) SALT SUBSTITUTE COMPOSITIONS

(75) Inventor: Ramon Efrain Vasquez, Drumond, Jujan de Cuyo (AR)

(73) Assignee: Ecosalt Corporation, Washington, DC (US)

( * ) Notice: Subject to any disclaimer, the term of this patent is extended or adjusted under 35 U.S.C. 154(b) by 0 days.

(21) Appl. No.: 10/337,392

(22) Filed: Jan. 7, 2003

Related U.S. Application Data

(63) Continuation of application No. 10/290,526, filed on Nov. 8, 2002, now abandoned.
(60) Provisional application No. 60/331,188, filed on Nov. 9, 2001.

(51) Int. Cl.[7] .................................................. H23I 1/22
(52) U.S. Cl. ....................................... 426/649; 426/622
(58) Field of Search .................................. 426/649, 622, 426/615, 650, 651

(56) References Cited

U.S. PATENT DOCUMENTS

| | | | | |
|---|---|---|---|---|
| 2,968,566 A | * | 1/1961 | Munch ........................ | 426/649 |
| 3,514,296 A | * | 5/1970 | Frank et al. ................. | 426/649 |
| 4,066,799 A | * | 1/1978 | Cornelius et al. ........... | 426/534 |

* cited by examiner

*Primary Examiner*—Helen Pratt
(74) *Attorney, Agent, or Firm*—Gilberto M. Villacorta; Robert W. Hahl; Katten Muchin Zavis Rosenman

(57) ABSTRACT

A composition useful as a substitute for table salt is disclosed. The salt substitute contains calcium chloride, a potassium salt, citric acid, rice flour, ginger oil and one or more flavorants.

16 Claims, No Drawings

SALT SUBSTITUTE COMPOSITIONS

CROSS-REFERENCE TO RELATED APPLICATIONS

This application is a continuation of, and claims benefit under 37 U.S.C. § 1.20 of U.S. patent application Ser. No. 10/290,526, filed Nov. 8, 2002, now abandoned which is incorporated by reference in its entirety, which claims benefit under 37 U.S.C. § 119(e) based on U.S. Provisional Application No. 60/331,188, filed Nov. 9, 2001, herein incorporated by reference in its entirety.

1. FIELD OF THE INVENTION

The present invention relates to low-sodium or sodium-free compositions, which can take the place of table salt.

2. DESCRIPTION OF THE RELATED ART

Many attempts have been made to produce reduced-sodium or sodium-free compositions for use as food seasonings. However, such compositions often lack palatability, reducing their commercial utility.

3. SUMMARY OF THE INVENTION

In one aspect, the present invention is directed to a composition which comprises calcium chloride, an acceptable potassium salt, citric acid, rice flour, ginger oil and a flavorant.

In another aspect, the present invention is directed to a composition which comprises calcium chloride, an acceptable potassium salt, sodium chloride, citric acid, rice flour, ginger oil and a flavorant.

In another aspect, the present invention is directed to a method for imparting a salty taste to a food substance, which comprises adding any of the foregoing compositions to a food substance.

Accordingly, a composition useful as a substitute for table salt is provided, which comprises about 5 wt % to about 30 wt % of calcium chloride, about 5 wt % to about 40 wt % of potassium salt, about 5 wt % to about 50 wt % of citric acid, about 5 wt % to about 50 wt % of rice flour, about 1 wt % to about 15 wt % of ginger oil and about 1 wt % to about 15 wt % of one or more flavorants. The salt substitute composition may further comprise about 10 wt % to about 50 wt % of sodium chloride, with a proportionate reduction in the wt % amounts of the other ingredients of the composition. In a preferred embodiment of the invention the potassium salt is potassium chloride, potassium citrate, or a combination thereof. Moreover, the one or more flavorants is selected from the group consisting of garlic powder, dehydrated parsley, onion powder, celery powder, and the like.

Consistent with the objectives of the present invention, the salt substitute may also be described as a low salt substitute of table salt in which the composition further comprises about 10 wt % to about 50 wt % of sodium chloride, with a proportionate reduction in the wt % amounts of the other ingredients of the composition.

Other aspects of the invention will become apparent to those of ordinary skill in the art, in view of the description provided herein.

4. DETAILED DESCRIPTION OF THE INVENTION

The substantially sodium-free compositions of the present invention may contain the individual components in a wide range of proportions depending on individual taste. The calcium chloride component preferably may be present in a range of from about 5 percent to about 30 percent by weight. The potassium salt component preferably may be present in a range of from about 5 percent to about 40 percent by weight. Any food-acceptable potassium salt is contemplated, with potassium citrate and potassium chloride being particularly preferred. The citric acid component preferably may be present in a range of from about 5 percent to about 50 percent by weight. The rice flour component preferably may be present in a range of from about 5 percent to about 50 percent by weight. The ginger oil and flavorant components each may preferably be present in a range of from about 1 percent to about 15 percent by weight.

The specific flavorant to be used in the present compositions will vary according to individual taste. A wide range of conventional flavorants are suitable. Particularly preferred are garlic powder, dehydrated parsley, onion powder, celery powder, etc. It will be understood that combinations of flavorants are within the scope of the invention.

Also within the scope of the present invention are low-sodium salt substitutes, in which one or more (or all) of the components of the substantially sodium-free compositions are replaced by a suitable proportion of sodium chloride. The amount of sodium chloride present in such compositions may vary widely depending on taste and desired amount of sodium content. The preferred amount of sodium chloride content is in the range of from about 10% to about 50% by weight.

The compositions of the present invention can be prepared by persons skilled in the art without an undue amount of experimentation using readily known techniques.

5. PREFERRED EMBODIMENTS OF THE INVENTION

5.1. Substantially Sodium-Free Salt Substitutes

The following compositions illustrate suitable substantially sodium-free salt substituted. They may be prepared by blending the individual ingredients.

| Component | Proportion by Weight |
| --- | --- |
| Composition 1 | |
| Calcium chloride | 10% |
| Potassium Citrate | 20% |
| Citric Acid | 30% |
| Rice Flour | 30% |
| Ginger Oil | 5% |
| Garlic Powder | 5% |
| Composition 2 | |
| Calcium chloride | 10% |
| Potassium Citrate | 20% |
| Citric Acid | 30% |
| Rice Flour | 30% |
| Ginger Oil | 5% |
| Dehydrated Parsley | 5% |
| Composition 3 | |
| Calcium chloride | 10% |
| Potassium Citrate | 20% |
| Citric Acid | 30% |
| Rice Flour | 30% |
| Ginger Oil | 5% |
| Onion Powder | 5% |

-continued

| Component | Proportion by Weight |
|---|---|
| Composition 4 | |
| Calcium chloride | 10% |
| Potassium Citrate | 20% |
| Citric Acid | 30% |
| Rice Flour | 30% |
| Ginger Oil | 5% |
| Celery Powder | 5% |
| Composition 5 | |
| Calcium chloride | 10% |
| Potassium Chloride | 20% |
| Citric Acid | 30% |
| Rice Flour | 30% |
| Ginger Oil | 5% |
| Garlic Powder | 5% |
| Composition 6 | |
| Calcium chloride | 10% |
| Potassium Chloride | 20% |
| Citric Acid | 30% |
| Rice Flour | 30% |
| Ginger Oil | 5% |
| Dehydrated Parsley | 5% |
| Composition 7 | |
| Calcium chloride | 10% |
| Potassium Chloride | 20% |
| Citric Acid | 30% |
| Rice Flour | 30% |
| Ginger Oil | 5% |
| Onion Powder | 5% |
| Composition 8 | |
| Calcium chloride | 10% |
| Potassium Chloride | 20% |
| Citric Acid | 30% |
| Rice Flour | 30% |
| Ginger Oil | 5% |
| Garlic Powder | 5% |

5.2. Low Sodium Salt Substitutes

The following compositions illustrate suitable low sodium salt substitutes. They may be prepared by blending the individual ingredients.

| Component | Proportion by Weight |
|---|---|
| Composition 9 | |
| Calcium chloride | 9% |
| Potassium Citrate | 18% |
| Sodium Chloride | 10% |
| Citric Acid | 27% |
| Rice Flour | 27% |
| Ginger Oil | 4.5% |
| Garlic Powder | 4.5% |
| Composition 10 | |
| Calcium chloride | 9% |
| Potassium Chloride | 18% |
| Sodium Chloride | 10% |
| Citric Acid | 27% |
| Rice Flour | 27% |
| Ginger Oil | 4.5% |
| Garlic Powder | 4.5% |
| Composition 11 | |
| Calcium chloride | 9% |
| Potassium Citrate | 18% |
| Sodium Chloride | 10% |
| Citric Acid | 27% |
| Rice Flour | 27% |
| Ginger Oil | 4.5% |
| Dehydrated Parsley | 4.5% |
| Composition 12 | |
| Calcium chloride | 9% |
| Potassium Citrate | 18% |
| Sodium Chloride | 10% |
| Citric Acid | 27% |
| Rice Flour | 27% |
| Ginger Oil | 4.5% |
| Garlic Powder | 4.5% |
| Composition 13 | |
| Calcium chloride | 9% |
| Potassium Chloride | 18% |
| Sodium Chloride | 10% |
| Citric Acid | 27% |
| Rice Flour | 27% |
| Ginger Oil | 4.5% |
| Celery Powder | 4.5% |
| Composition 14 | |
| Calcium chloride | 9% |
| Potassium Chloride | 18% |
| Sodium Chloride | 10% |
| Citric Acid | 27% |
| Rice Flour | 27% |
| Ginger Oil | 4.5% |
| Dehydrated Parsley | 4.5% |
| Composition 15 | |
| Calcium chloride | 9% |
| Potassium Chloride | 18% |
| Sodium Chloride | 10% |
| Citric Acid | 27% |
| Rice Flour | 27% |
| Ginger Oil | 4.5% |
| Onion Powder | 4.5% |
| Composition 16 | |
| Calcium chloride | 9% |
| Potassium Chloride | 18% |
| Sodium Chloride | 10% |
| Citric Acid | 27% |
| Rice Flour | 27% |
| Ginger Oil | 4.5% |
| Celery Powder | 4.5% |

It should now be apparent that many other embodiments of the invention can be readily contemplated in view of the teachings of this specification. The invention should not be held to be limited to such embodiments, which invention is limited solely by the appended claims.

What is claimed is:

1. A composition which comprises:
   about 30% by weight citric acid;
   about 10% by weight calcium chloride;
   about 20% by weight potassium citrate;
   about 30% by weight rice flour;
   about 5% by weight ginger oil; and
   about 5% by weight garlic powder.

2. A composition which comprises:
   about 30% by weight citric acid;
   about 10% by weight calcium chloride;
   about 20% by weight potassium chloride;
   about 30% by weight rice flour;
   about 5% by weight ginger oil; and about 5% by weight garlic powder.

3. A composition which comprises:
about 27% by weight citric acid;
about 9% by weight calcium chloride;
about 18% by weight potassium citrate;
about 27% by weight rice flour;
about 10% by weight sodium chloride;
about 4.5% by weight ginger oil; and
about 4.5% by weight garlic powder.

4. A composition which comprises:
about 27% by weight citric acid;
about 9% by weight calcium chloride;
about 18% by weight potassium chloride;
about 27% by weight rice flour;
about 10% by weight sodium chloride;
about 4.5% by weight ginger oil; and
about 4.5% by weight garlic powder.

5. A composition useful as a substitute for table salt comprising about 10 wt % of calcium chloride, about 20 wt % of potassium salt, about 30 wt % of citric acid, about 30 wt % of rice flour, about 5 wt % of ginger oil and about 5 wt % of one or more flavorants.

6. The composition of claim 5 which further comprises about 10 wt % of sodium chloride, with a proportionate reduction in the wt % amounts of the other ingredients of the composition.

7. The composition of claim 6 in which the potassium salt is potassium chloride, potassium citrate, or a combination thereof.

8. The composition of claim 6 in which the one or more flavorants is selected from the group consisting of garlic powder, dehydrated parsley, onion powder, and celery powder.

9. The composition of claim 5 in which the potassium salt is potassium chloride, potassium citrate, or a combination thereof.

10. The composition of claim 5 in which the one or more flavorants is selected from the group consisting of garlic powder, dehydrated parsley, onion powder, and celery powder.

11. A composition useful as a substitute for table salt comprising about 5 wt % to about 30 wt % of calcium chloride, about 5 wt % to about 40 wt % of potassium salt, about 5 wt % to about 50 wt % of citric acid, about 5 wt % to about 50 wt % of rice flour, about 1 wt % to about 15 wt % of ginger oil and about 1 wt % to about 15 wt % of one or more flavorants.

12. The composition of claim 11 which further comprises about 10 wt % to about 50 wt % of sodium chloride, with a proportionate reduction in the wt % amounts of the other ingredients of the composition.

13. The composition of claim 12 in which the potassium salt is potassium chloride, potassium citrate, or a combination thereof.

14. The composition of claim 12 in which the one or more flavorants is selected from the group consisting of garlic powder, dehydrated parsley, onion powder, and celery powder.

15. The composition of claim 11 in which the potassium salt is potassium chloride, potassium citrate, or a combination thereof.

16. The composition of claim 11 in which the one or more flavorants is selected from the group consisting of garlic powder, dehydrated parsley, onion powder, and celery powder.

* * * * *